US008239583B2

(12) United States Patent
Corry et al.

(10) Patent No.: US 8,239,583 B2
(45) Date of Patent: *Aug. 7, 2012

(54) MIGRATING DOMAINS FROM ONE PHYSICAL DATA PROCESSING SYSTEM TO ANOTHER

(75) Inventors: Kevin M. Corry, Pflugerville, TX (US); Mark A Peloquin, Austin, TX (US); Steven L Pratt, Leander, TX (US); Santhosh Rao, Austin, TX (US); Karl M Rister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/795,083

(22) Filed: Jun. 7, 2010

(65) Prior Publication Data

US 2010/0250786 A1    Sep. 30, 2010

Related U.S. Application Data

(63) Continuation of application No. 11/608,067, filed on Dec. 7, 2006, now Pat. No. 7,761,612.

(51) Int. Cl.
G06F 15/177 (2006.01)
G06F 15/16 (2006.01)
G06F 15/173 (2006.01)
G06F 9/455 (2006.01)
G06F 9/46 (2006.01)

(52) U.S. Cl. ............... 710/8; 710/15; 710/316; 709/220; 709/221; 709/223; 709/224; 709/225; 709/226; 709/229; 709/238; 709/239; 709/242; 711/6; 718/1; 718/100; 718/104

(58) Field of Classification Search ........................ None
See application file for complete search history.

(56) References Cited

U.S. PATENT DOCUMENTS

| 6,775,672 | B2 | 8/2004 | Mahalingam et al. |
| 6,802,062 | B1 * | 10/2004 | Oyamada et al. ................. 718/1 |
| 6,880,002 | B2 | 4/2005 | Hirschfeld et al. |
| 6,944,785 | B2 | 9/2005 | Gadir et al. |
| 7,085,883 | B1 | 8/2006 | Dalgic et al. |
| 7,546,398 | B2 | 6/2009 | Corneli et al. |
| 2002/0156987 | A1 | 10/2002 | Gajjar et al. |

(Continued)

OTHER PUBLICATIONS

U.S. Appl. No. 11/608,067, 3 pages.

(Continued)

Primary Examiner — Tanh Nguyen
(74) Attorney, Agent, or Firm — Francis Lammes; Stephen J. Walder, Jr.; Steven L. Bennett

(57) ABSTRACT

A system and method for migrating domains from one physical data processing system to another are provided. With the system and method, domains may be assigned direct access to physical I/O devices but in the case of migration, the I/O devices may be converted to virtual I/O devices without service interruption. At this point, the domain may be migrated without limitation. Upon completion of the migration process, the domain may be converted back to using direct physical access, if available in the new data processing system to which the domain is migrated. Alternatively, the virtualized access to the I/O devices may continue to be used until the domain is migrated back to the original data processing system. Once migration back to the original data processing system is completed, the access may be converted back to direct access with the original physical I/O devices.

21 Claims, 10 Drawing Sheets

U.S. PATENT DOCUMENTS

| | | |
|---|---|---|
| 2003/0188114 A1 | 10/2003 | Lubbers et al. |
| 2004/0167996 A1 | 8/2004 | Takamura et al. |
| 2005/0044284 A1 | 2/2005 | Pescatore |
| 2005/0193180 A1 | 9/2005 | Fujibayashi |
| 2005/0251802 A1 | 11/2005 | Bozek et al. |
| 2006/0010176 A1 | 1/2006 | Armington |
| 2006/0174087 A1 | 8/2006 | Hashimoto et al. |
| 2006/0179343 A1 | 8/2006 | Kitamura |
| 2007/0079307 A1 | 4/2007 | Dhawan et al. |
| 2007/0239854 A1 | 10/2007 | Janakiraman et al. |
| 2008/0005297 A1 | 1/2008 | Kjos et al. |
| 2008/0126579 A1 | 5/2008 | Corneli et al. |
| 2008/0140866 A1 | 6/2008 | Corry et al. |

OTHER PUBLICATIONS

U.S. Appl. No. 12/795,120, 1 page.

Notice of Allowance mailed Oct. 5, 2010 for U.S. Appl. No. 12/795,120; 8 pages.

"Advanced POWER Virtualization", http://www-03.ibm.com/systems/p/apv/features.html, Accessed Nov. 13, 2006, 2 pages.

* cited by examiner

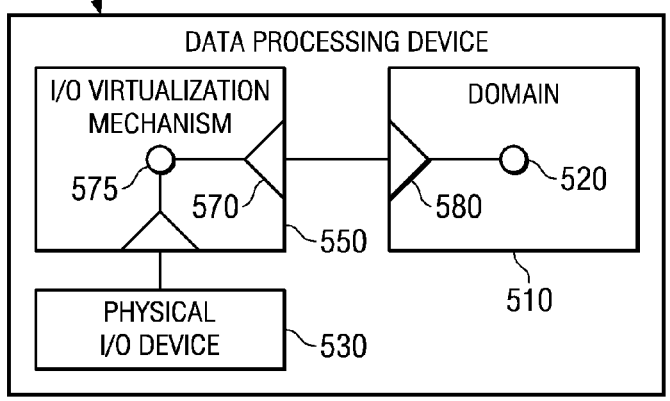
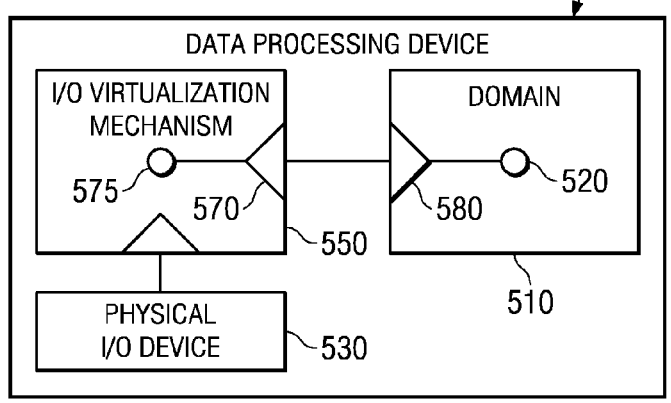
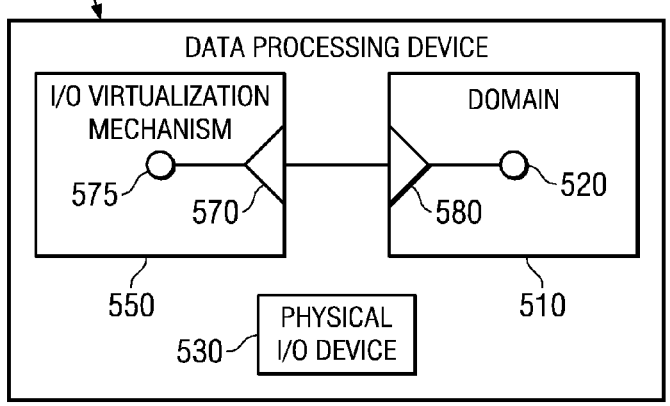

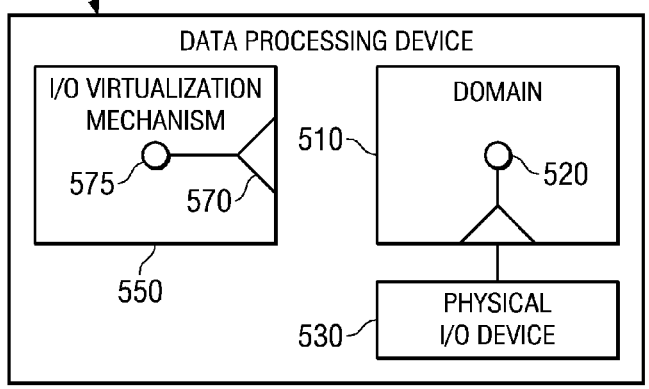
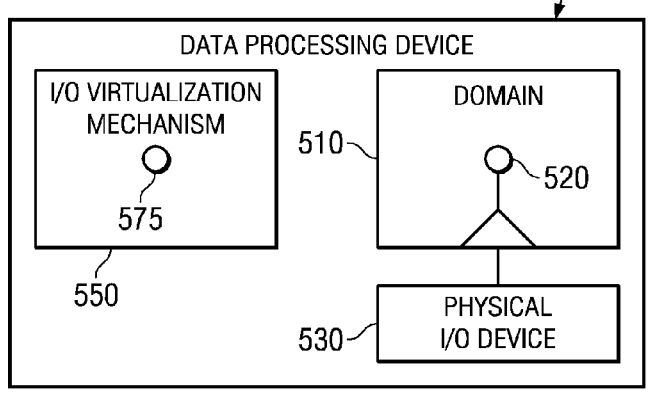
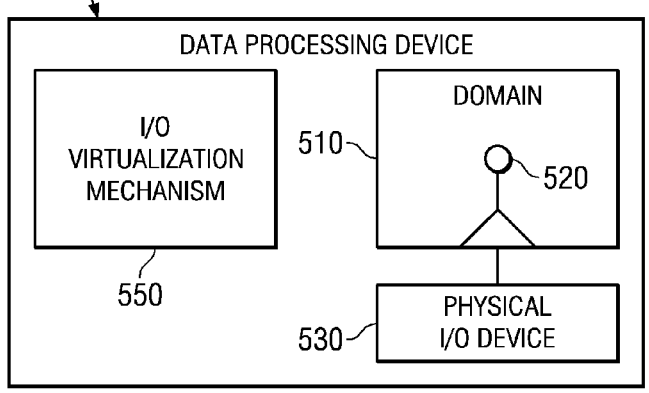

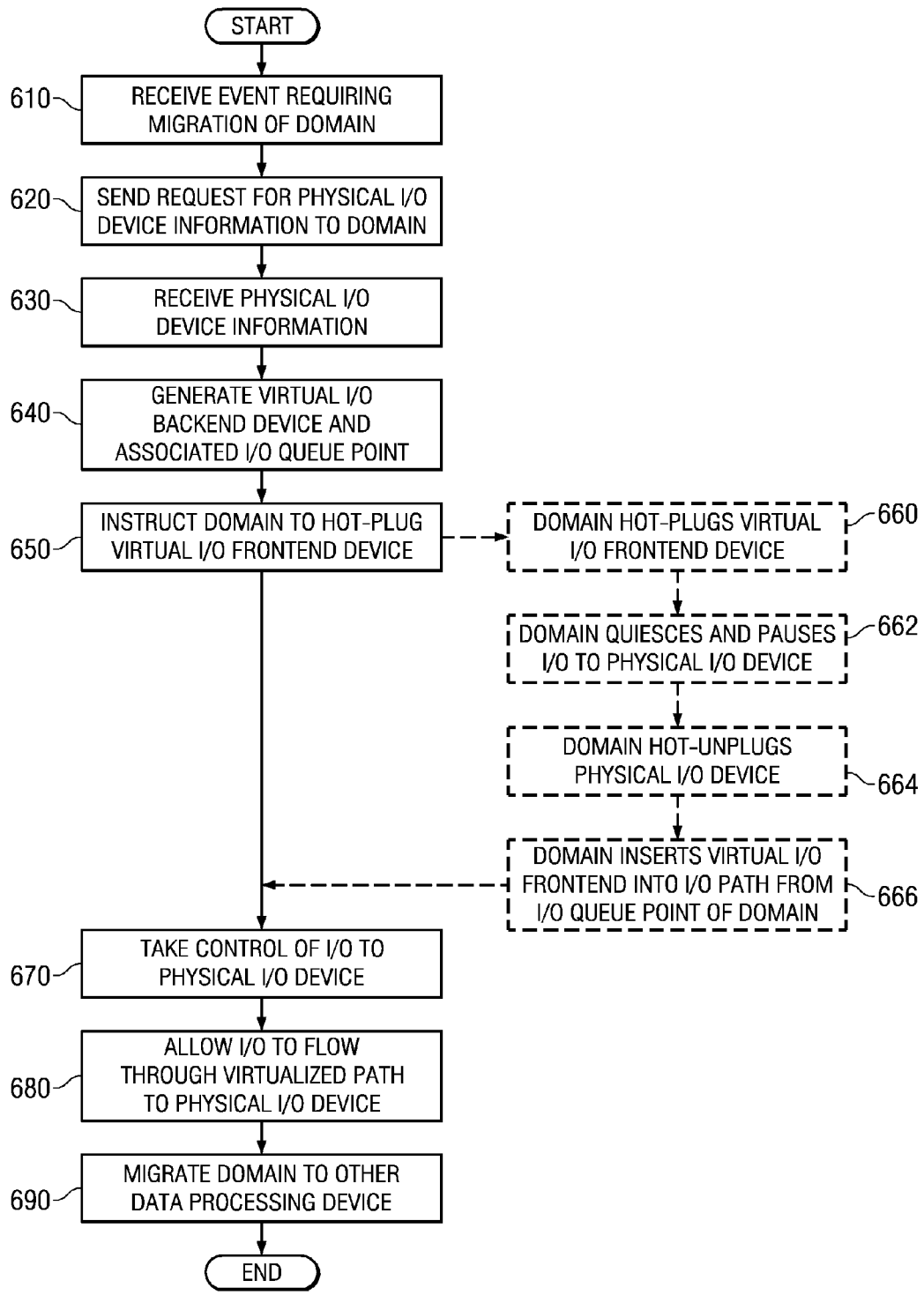

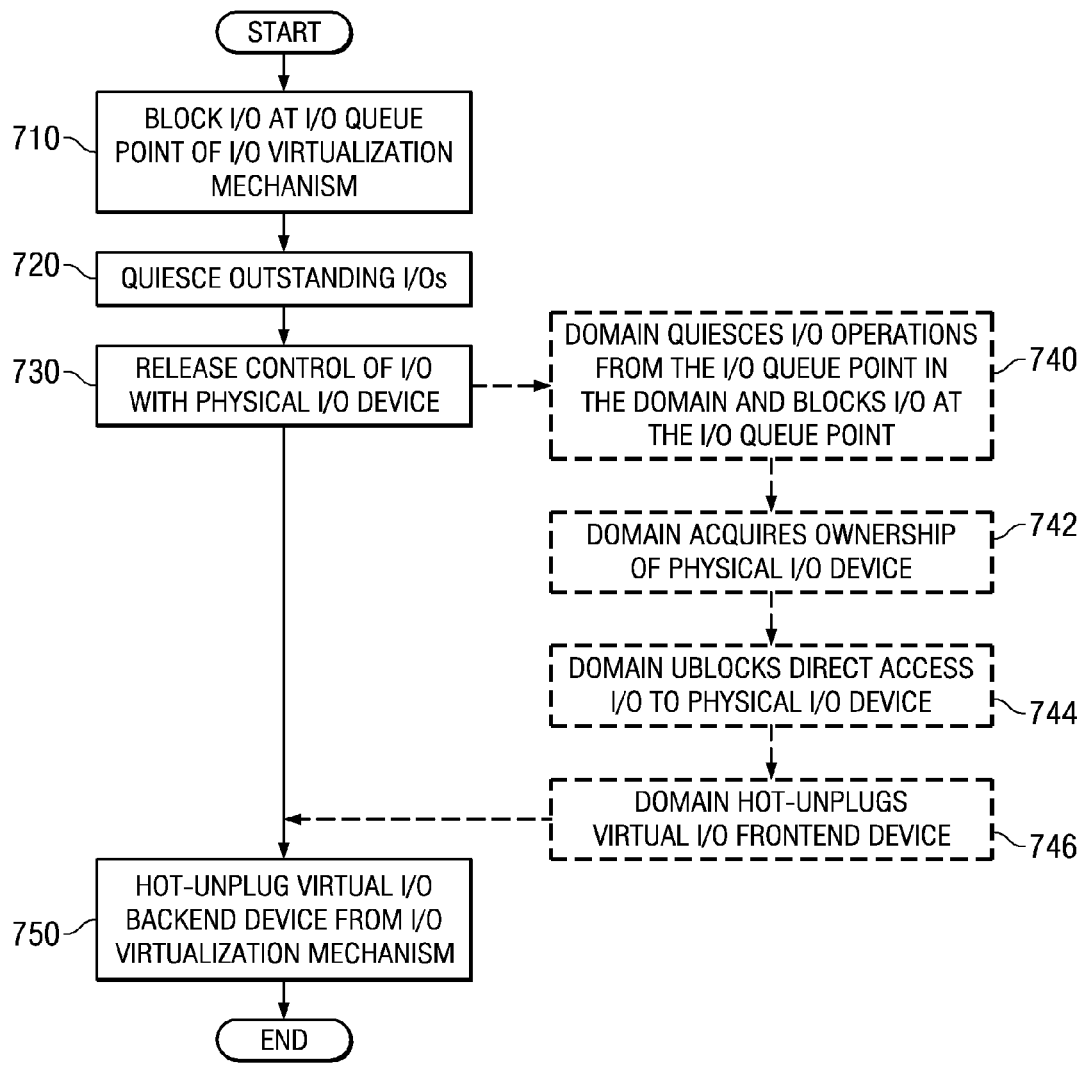

MIGRATING DOMAINS FROM ONE PHYSICAL DATA PROCESSING SYSTEM TO ANOTHER

This application is a continuation of application Ser. No. 11/608,067, filed Dec. 7, 2006, status pending.

BACKGROUND

1. Technical Field

The present application relates generally to an improved data processing system and method. More specifically, the present application is directed to a system and method for migrating domains from one physical data processing system to another.

2. Description of Related Art

In data processing environments, virtualization is a technique for hiding the physical characteristics of computing resources from the way in which other systems, applications, or end users interact with those resources. Virtualization may include, for example, making a single physical resource, e.g., a server, an operating system, an application, storage device, or the like, appear to function as multiple logical resources. Moreover, virtualization may include making multiple physical resources, such as storage devices, servers, or the like, appear as a single logical resource.

A key part of a virtualized environment is the ability to migrate live domains, virtual machines, partitions, or other logical entities specifying a grouping of logical elements (hereafter referred to as a domain) from one physical computing system, e.g., a server, to another. Such migration may be required in order to provide continuous service during scheduled maintenance or even as part of a disaster recovery operation.

In order to maintain optimal performance for a virtualized operating system, the domain must be given direct access to physical input/output (I/O) devices, i.e. the domain may "own" the physical I/O devices, such as storage controllers and network interface cards (NICs). Currently, virtualization migration is limited in that no physical I/O devices can be owned by the domains that are to be migrated, that is they must rely completely on virtualized I/O. This limitation exists because during migration, it cannot be guaranteed that the physical I/O device(s) that are present in the first physical computing system will be present in the other physical computing device to which the virtualized domain is being migrated.

Thus, in order to ensure the migratability of the virtual domains, all I/O is virtualized rather than allowing direct access to the physical I/O devices. This limitation leads to potential performance impacts, since virtualized I/O requires additional overhead operations that are not required in direct access I/O. Such performance impacts may be unacceptable with certain data processing environments depending on the requirements of a given environment.

SUMMARY

The illustrative embodiments provide a system and method for migrating domains from one physical data processing system to another. With the mechanisms of the illustrative embodiments, domains may be assigned direct access to physical I/O devices but in the case of migration, the I/O devices may be converted to virtual I/O devices without service interruption. At this point, the domain may be migrated without limitation. Upon completion of the migration process, the domain can be converted back to using direct physical access, if available in the new data processing system to which the domain is migrated. Alternatively, the virtualized access to the I/O devices may continue to be used until the domain is migrated back to the original data processing system, such as after completion of the scheduled maintenance, for example. Once migration back to the original data processing system is completed, the access may be converted back to direct access with the original physical I/O devices.

In one illustrative embodiment, a method is provided for migrating a domain from a first data processing device to a second data processing device. The method may comprise configuring the domain for direct access of a first physical input/output (I/O) device and reconfiguring the domain for virtualized access of the first physical I/O device via an I/O virtualization mechanism in response to an event requiring migration of the domain. The method may further comprise migrating the domain from the first data processing device to the second data processing device following reconfiguration of the domain for virtualized access of the first physical I/O device. The I/O virtualization mechanism may be one of a virtual I/O server or a hypervisor.

The event requiring migration of the domain may be one of a human operator generated event or an automatically generated event. The automatically generated event may be one of an event occurring automatically in accordance with a pre-established schedule or an event occurring automatically in response to a detected condition of the first data processing device or the data processing system.

The method may further comprise reconfiguring the domain for direct access of a second physical I/O device following migration of the domain from the first data processing device to the second data processing device. Moreover, the method may comprise determining if the domain is migrated back to the first data processing device after having been migrated to the second data processing device. The domain may be reconfigured for direct access of the first physical I/O device following migration of the domain back to the first data processing device.

Reconfiguring the domain for virtualized access of the first physical I/O device may comprise generating a virtual device in the I/O virtualization mechanism that is logically the same as the first physical I/O device. Moreover, reconfiguring the domain for virtualized access of the first physical I/O device may comprise blocking I/O operations just prior to the I/O operations being sent to the first physical I/O device and injecting the virtual device into the domain.

The reconfiguring of the domain for virtualized access of the first physical I/O device may comprise releasing the first physical I/O device from direct access by the domain, inserting the virtual device into an I/O path between a queue point of the domain and the first physical I/O device, and allowing I/O operations to the first physical I/O device to resume. The I/O operations may be routed to the virtual device rather than the first physical I/O device. Releasing the first physical I/O device from direct access by the domain may comprise quiescing, in the domain, outstanding requests to the first physical I/O device and pausing, in the domain, I/O operations to the first physical I/O device.

The virtual device may comprise a virtual device frontend provided in the domain and a virtual device backend provided in the I/O virtualization mechanism. Reconfiguring the domain for virtualized access of the first physical I/O device may comprise generating a queue point in the I/O virtualization mechanism associated with the virtual device backend. Reconfiguring the domain may further comprise obtaining, by the I/O virtualization mechanism, direct access to the first physical I/O device and routing I/O operations from the domain via the virtual device frontend to the virtual device backend, through the queue point in the I/O virtualization mechanism, to the first physical I/O device.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a data processing system is provided. The data processing system may comprise a first data processing device and a second data processing device coupled to the first data processing device. A domain, in the first data processing device, may be configured for direct access of a first physical input/output (I/O) device. The domain, in the first data processing device, may be reconfigured for virtualized access of the first physical I/O device via an I/O virtualization mechanism, of the first data processing device, in response to an event requiring migration of the domain. The domain may be migrated from the first data processing device to the second data processing device following reconfiguration of the domain for virtualized access of the first physical I/O device.

The event requiring migration of the domain may be one of a human operator generated event or an automatically generated event. The automatically generated event may be one of an event occurring automatically in accordance with a pre-established schedule or an event occurring automatically in response to a detected condition of the first data processing device or the data processing system.

The domain may be reconfigured for direct access of a second physical I/O device following migration of the domain from the first data processing device to the second data processing device. If the domain is migrated back to the first data processing device after having been migrated to the second data processing device, the domain may be reconfigured for direct access of the first physical I/O device following migration of the domain back to the first data processing device.

The domain may be reconfigured for virtualized access of the first physical I/O device by generating a virtual device in the I/O virtualization mechanism that is logically the same as the first physical I/O device. The domain may be reconfigured for virtualized access of the first physical I/O device by blocking I/O operations just prior to the I/O operations being sent to the first physical I/O device and injecting the virtual device into the domain. Moreover, the domain may be reconfigured for virtualized access of the first physical I/O device by releasing the first physical I/O device from direct access by the domain, inserting the virtual device into an I/O path between a queue point of the domain and the first physical I/O device, and allowing I/O operations to the first physical I/O device to resume. The I/O operations may be routed to the virtual device rather than the first physical I/O device.

The first physical I/O device may be released from direct access by the domain by quiescing, in the domain, outstanding requests to the first physical I/O device, and pausing, in the domain, I/O operations to the first physical I/O device.

The virtual device may comprise a virtual device frontend provided in the domain and a virtual device backend provided in the I/O virtualization mechanism. The domain may be reconfigured for virtualized access of the first physical I/O device by generating a queue point in the I/O virtualization mechanism associated with the virtual device backend, obtaining, by the I/O virtualization mechanism, direct access to the first physical I/O device, and routing I/O operations from the domain via the virtual device frontend to the virtual device backend, through the queue point in the I/O virtualization mechanism, to the first physical I/O device.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A-5I are exemplary diagrams illustrating an operation for converting virtualized I/O to direct access I/O following migration of a domain in accordance with one illustrative embodiment;

FIG. 6 is a flowchart outlining an exemplary operation for migrating a domain from one data processing system to another in accordance with one illustrative embodiment; and FIG. 7 is a flowchart outlining an exemplary operation for converting virtualized I/O into direct access I/O following migration of a domain from one data processing system to another in accordance with one illustrative embodiment.

DETAILED DESCRIPTION OF THE ILLUSTRATIVE EMBODIMENTS

Figure 1:
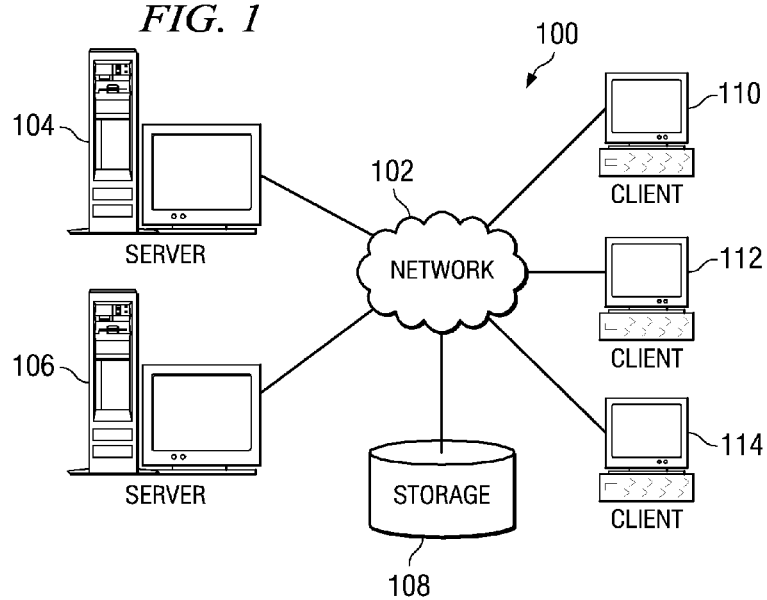
FIG. 1 is an exemplary diagram of a distributed data processing system in which aspects of the illustrative embodiments may be implemented.
Figure 2:
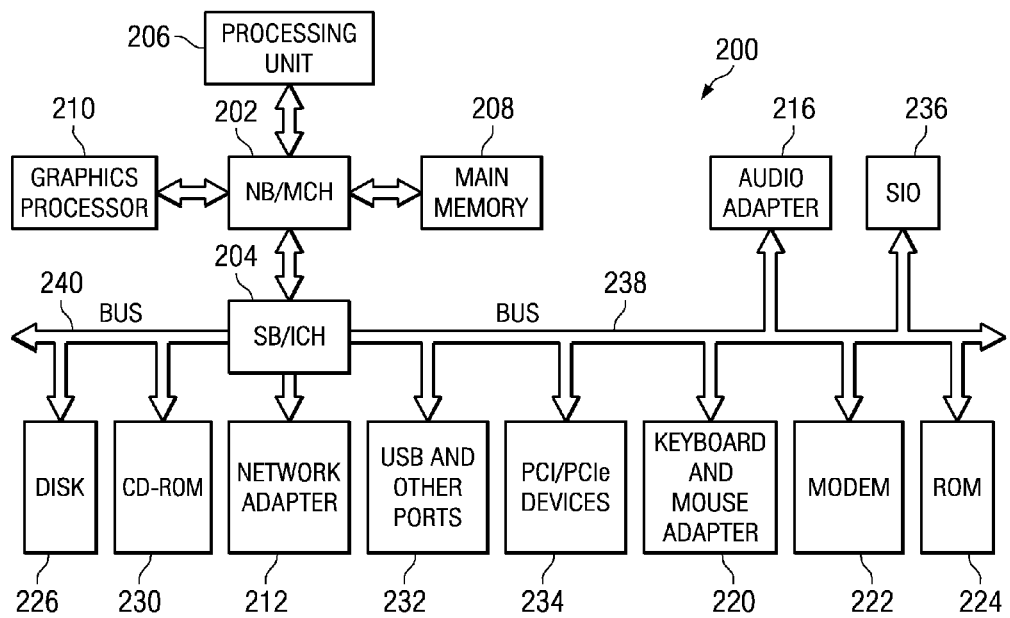
FIG. 2 is an exemplary diagram of a data processing device in which exemplary aspects of the illustrative embodiments may be implemented.

The illustrative embodiments provide a system and method for migrating domains from one physical data processing system to another. As such, the mechanisms of the illustrative embodiments are preferably implemented in a distributed data processing system in which domains may be migrated from one data processing device or system to another in the distributed data processing system. FIGS. 1-2, hereafter, are provided as examples of data processing environments in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, servers 104 and 106 may provide application domains and data processing system resources, such as input/output (I/O) devices, that may be accessed by applications in the application domains via direct access operations, i.e. non-virtualized I/O operations. In accordance with the mechanisms of the illustrative embodiments, an application domain from one server, e.g., server 104, may be migrated to another server, e.g., server 106, without service interruption even though that application domain may be utilizing direct access operations. Such migration is made possible by the illustrative embodiments since mechanisms are provided for converting the direct access to I/O devices to a virtualized access that is required to allow migration of the domain. Thereafter, if the new server, e.g., server 106, has associated I/O devices corresponding to those with which the application domain originally had direct access, then direct access may be reinitialized after migration to the new server. If the new server does not have associated I/O devices corresponding to those with which the application domain had originally had direct access, then virtualized I/O operations may continue to be utilized until the application domain is migrated back to the original server, e.g., server 104.

In this way, direct access I/O operations are permitted such that an application domain may "own" I/O devices and obtain the performance benefits of direct access to the I/O devices. However, in the event of a needed migration, the I/O may be virtualized so as to facilitate migration. Thus, performance enhancement is achieved while maintaining service availability.

Figure 3:
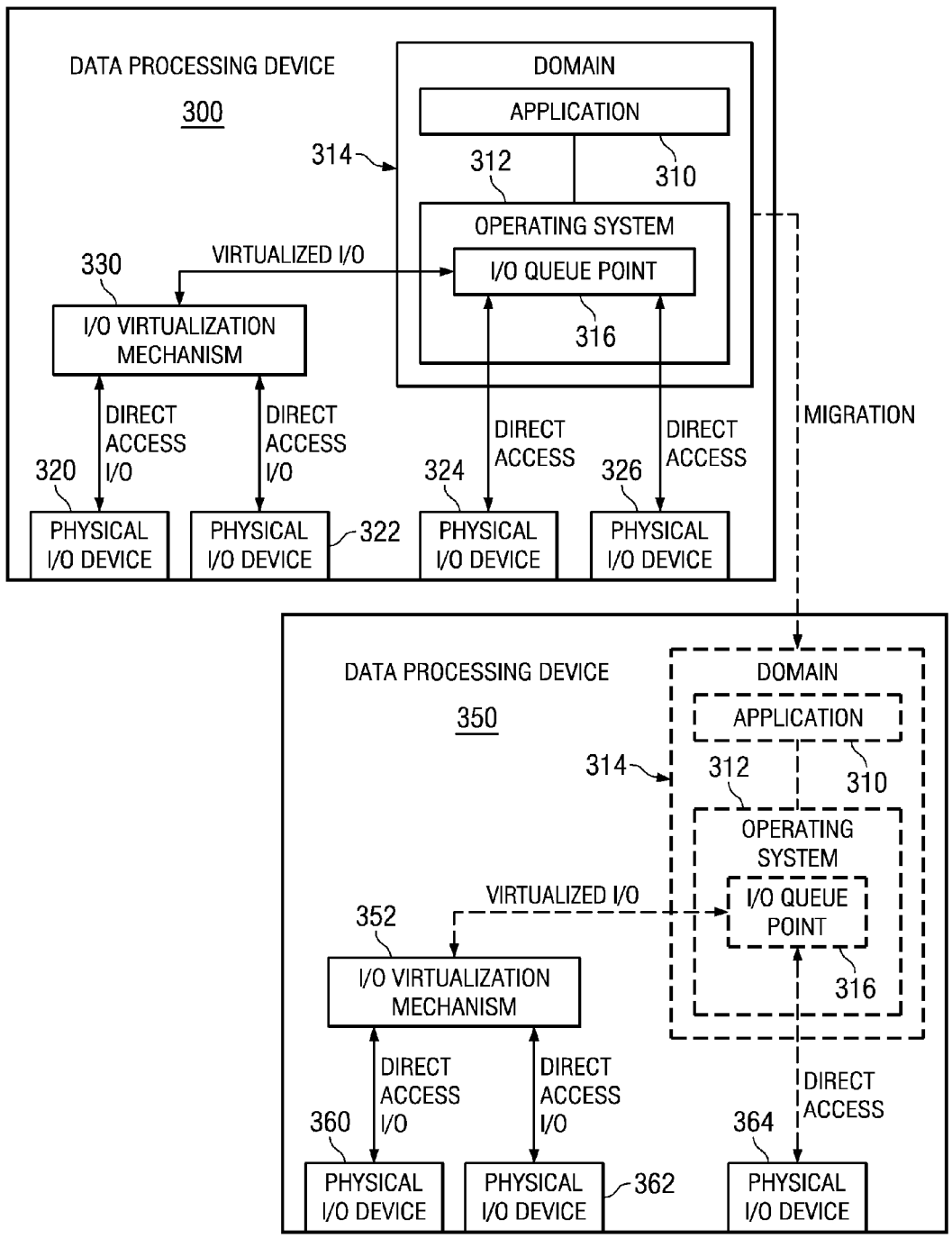
FIG. 3 is an exemplary block diagram depicting the primary operational components of a data processing device in accordance with one illustrative embodiment.

FIG. 3 is an exemplary block diagram depicting the primary operational components of a data processing device in accordance with one illustrative embodiment. It should be appreciated that elements shown in FIG. 3 may be implemented in hardware, software, or any combination of hardware and software. In one illustrative embodiment, the elements shown within the data processing devices in FIG. 3 are implemented as software instructions executed by one or more processors of the data processing devices.

As shown in FIG. 3, the primary operational components comprise a first data processing device 300, e.g., a server, in which an application 310 and operating system 312 are provided in a domain 314. The operating system 312 provides an input/output (I/O) queue point 316 through which I/O operations between the application 310 and physical I/O devices 320-326 are made possible. The I/O queue point 316 queues the I/O operations sent to or received from the physical I/O devices 320-326 for processing by the operating system 312 in order to control and route the flow of I/O operations.

The data processing device 300 further includes an I/O virtualization mechanism 330. The I/O virtualization mechanism 300 may be, for example, a virtual I/O server, a hypervisor, or the like. The I/O virtualization mechanism 330 performs operations for virtualizing I/O transactions or operations between domains, e.g., domain 314, and physical I/O devices, e.g., physical I/O devices 320-326. Hypervisors and virtual I/O servers are generally known in the art. However, the I/O virtualization mechanism 330 of the illustrative embodiments is enhanced to provide additional logic and functionality for virtualizing direct access connections between a domain and one or more physical I/O devices 320-326 in the event of a migration of the domain from one data processing device to another.

This additional logic and functionality in the I/O virtualization mechanism 330 includes logic for generating one or more virtual devices that are logically the same as the physical I/O device(s) with which the domain 314 is currently associated, i.e. the physical I/O device(s) the domain 314 "owns" and is currently directly accessing. The logic further provides functionality for blocking I/O operations just prior to the I/O operations being sent to the physical I/O device(s) and injecting (hot-plugging) the virtual device(s) into the running domain. The logic further provides functionality for quiescing outstanding requests to the physical I/O device(s) to a point at which I/O's to the physical I/O device(s) may be paused.

The logic further provides functionality for claiming control of I/O operations with the physical I/O device(s) in response to the domain releasing (hot-unplugging) the physical I/O device(s) and inserting the new virtual device(s) into the blocked I/O path and allowing I/O operations to resume. The I/O operations directed to/from the physical I/O device(s) are controlled using the newly created virtual I/O device(s) provided by the I/O virtualization mechanism 330. After claiming control of the I/O operations with the physical I/O device(s) via the newly created virtual device(s), the I/O virtualization mechanism 330 then unblocks I/O operations for the new virtual device(s) and allows I/O operations to flow to/from the physical I/O device(s) via the newly created virtual device(s).

At this point migration of the domain may be made possible through known mechanisms for migration. The migration is made possible because the domain no longer has ownership of the physical I/O device(s) and all I/O operations are performed through the virtual device(s) provided by the I/O virtualization mechanism 330.

It should be appreciated that the logic provided in the I/O virtualization mechanism 330 may include logic for performing the reverse operation for reinstating direct access, i.e. ownership, of the physical I/O device by a domain. Such a reverse operation may be performed, for example, in the data processing device to which the domain is migrated if the data processing device has the necessary physical I/O devices for which direct access, i.e. ownership, by the domain is possible. Moreover, such reverse operation may be performed in response to migration back to the original data processing device, such as following completion of scheduled maintenance, or the like. Basically, the reverse operation may be performed at any time where conversion from virtualized I/O operations to direct access by the domain is desired and possible.

Another data processing device 350 having an I/O virtualization mechanism 352 similar to the I/O virtualization mechanism 330 of data processing device 300 is provided. The data processing device 350 further includes one or more physical I/O devices 360-364. The domain 314 may be migrated from data processing device 300 to data processing device 350 using the logic of the I/O virtualization mechanisms 330 and 352 to convert, in the data processing system 300, the direct access to the physical I/O device(s) 320-326 into a virtualized I/O access and then either continuing the virtualized I/O access or converting the virtualized I/O access to direct access after migration to the data processing system 350.

FIGS. 4A-4I are exemplary diagrams illustrating an operation for virtualizing a physical I/O device in order to permit domain migration in accordance with one illustrative embodiment. It should be appreciated that the operation illustrated in FIGS. 4A-4I is described with regard to a single physical I/O device but may be extended to multiple physical I/O devices. That is, the same operation may be performed with regard to each physical I/O device with which the domain has direct access so that the direct access to each physical I/O device is virtualized in order to allow migration of the domain.

Figure 4A:
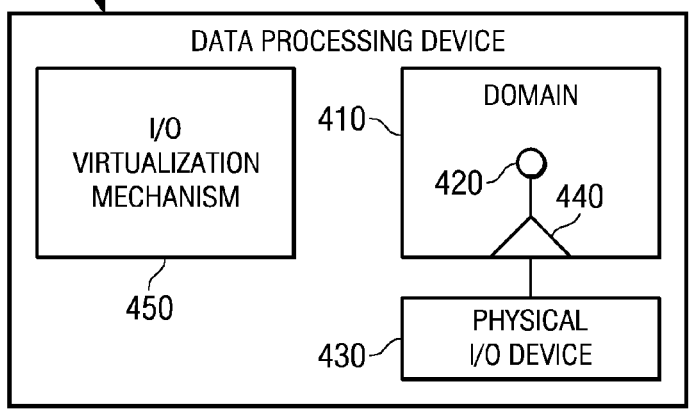
FIGS. 4A-4I are exemplary diagrams illustrating an operation for virtualizing a physical I/O device in order to permit domain migration in accordance with one illustrative embodiment.
Figure 4B:
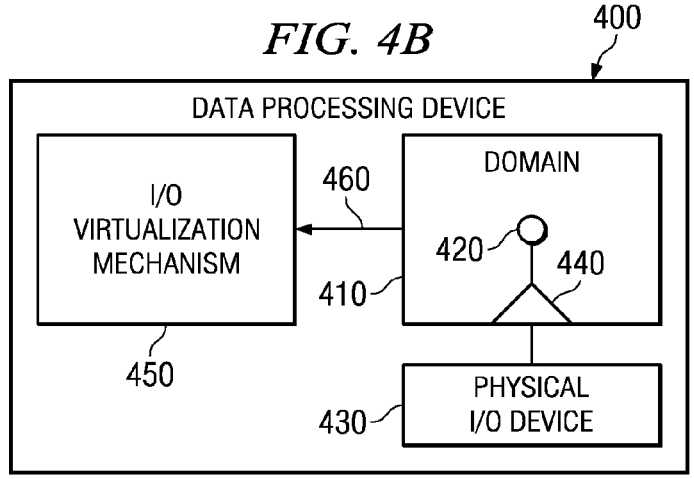

As shown in FIG. 4A, the initial running data processing system 400 includes a domain 410 having an I/O queue point 420, which may be provided by an operating system associated with the domain 410, for example. The domain 410 has ownership, i.e. direct access, to the physical I/O device 430 represented by the triangle 440. Direct access means that the I/O operations need not be processed by the I/O virtualization mechanism 450 using a virtual I/O device and can be sent directly from the domain to the physical I/O device 430.

In response to an event occurring that requires migration of the domain 410 to another data processing device, e.g., migration from data processing device 300 to data processing device 350 in FIG. 3, the domain 410 provides information to the I/O virtualization mechanism 450 that is required for creating a virtual device that is logically the same as the physical I/O device 430 that the domain 410 is currently using with direct access. This operation is shown as the arrow 460 in FIG. 4B indicating a transfer of information from the domain 410 to the I/O virtualization mechanism 450. The information may be provided, for example, in association with an instruction to the I/O virtualization mechanism 450 to create a virtual device for the physical I/O device 430 and take over control of the I/O operations to the physical I/O device 430, for example. Alternatively, the information may be provided in response to a request from the I/O virtualization mechanism 450 for the information in order to generate a virtual device for the physical I/O device 430 in order to facilitate migration of the domain 410.

The particular information that is transferred from the domain 410 to the I/O virtualization mechanism 450 depends on the type of physical I/O device 430 with which the domain 410 has direct access. For example, if the physical I/O device 430 is a hard disk controller, information regarding the disk geometry of the hard disk, such as heads, cylinders, etc., may be transferred from the domain 410 to the I/O virtualization mechanism 450. The virtualization of physical I/O devices is generally known in the art (for example see www.ibm.com/systems/p/apv/features.html) and thus, a more detailed explanation is not provided herein.

The event causing the initiation of the virtualization of the physical I/O device 430 for migration purposes may be any event that requires migration of the domain 410 to another data processing device. For example, the event may be a system administrator providing input to initiate the migration operation. Moreover, the event may be an automated event, such as a maintenance event occurring automatically in accordance with a pre-established schedule or detected condition of the data processing device/system.

In both of those scenarios, the migration can occur for two different reasons. The first reason is to perform some type of system maintenance, such as a hardware upgrade or replacement. The second reason is for performance reasons. That is, it is possible that due to the load being incurred upon a system by the domains which the system is running that certain domains may be getting starved of a certain resource (processor time, memory, etc.). These resources can be provided by migrating the domain to a system with spare or less utilized resources available.

Figure 4C:
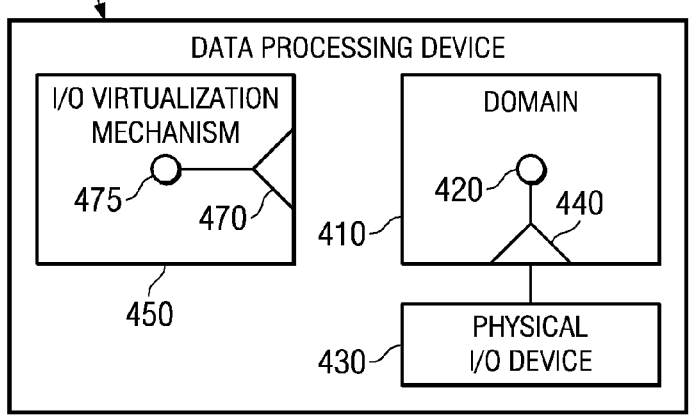

In response to receiving the information for the physical I/O device 430 from the domain 410, as shown in FIG. 4C, the I/O virtualization mechanism 450 creates a virtual I/O backend device 470, which is an instance of the virtual device that is logically the same as the physical I/O device 430 provided by the I/O virtualization mechanism 450. In addition, the I/O virtualization mechanism 450 creates an I/O queue point 475 for queuing I/O operations or transactions for receiving I/O operations or transactions from the virtual I/O backend device 470. The I/O queue point 475 associated with the virtual I/O backend device 470 blocks the I/O operations and transactions just prior to the I/O operations/transactions being sent to the physical I/O device 430 as illustrated by the lack of connection between the I/O queue point 475 and the physical I/O device 430 in FIG. 4C.

The creation of a virtual device is generally known in the art and thus, a detailed explanation is not provided herein. As an example, the Device Mapper code that is provided in the Linux operating system kernel provides an ability to generate virtual devices that are logically the same as physical I/O devices. In the Device Mapper code, a virtual device is created to represent a storage object. This virtual device can be controlled and has operations to pause, resume, re-map, etc. The virtual device also has an associated queue where I/O operations are funneled when the virtual device is paused. When a resume operation is initiated the I/O operations that are held in the queue are resubmitted to the virtual device.

Figure 4D:
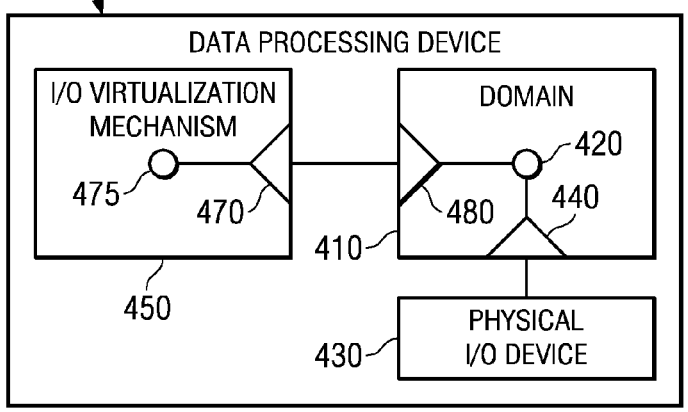

After creation of the virtual I/O backend device 470, the I/O virtualization mechanism 450 injects, or hot-plugs, the virtual device into the domain 410, as shown in FIG. 4D. The hot-plugging of the virtual device into the domain 410 causes the domain 410 to generate a virtual I/O frontend device 480 in the domain 410. The virtual I/O backend device represents the driver entity that is in the I/O virtualization mechanism 450 while the frontend device 480 represents the driver entity that is in the domain 410.

The virtual I/O frontend device 480 is associated with the virtual I/O backend device 470. The virtual I/O frontend device 480 will receive I/O operations directed to the physical I/O device 430 and direct the I/O operations to the virtual I/O backend device 480, as discussed hereafter. The hot-plugging of the virtual device may be performed, for example, by the I/O virtualization mechanism 450 instructing the domain 410 to instantiate the virtual device. Such instruction may be performed in a similar manner as hot-plugging a Universal Serial Bus (USB) device in known systems with the exception that the I/O virtualization mechanism 450 spawns the event that causes the hot-plugging of the virtual device into the domain 410.

Figure 4E:
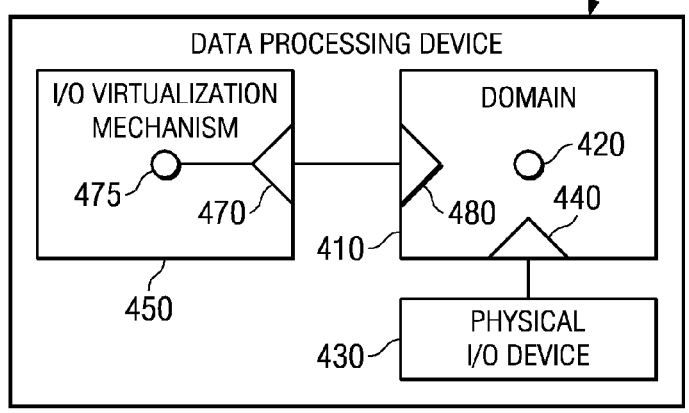

As shown in FIG. 4E, the domain 410 quiesces outstanding request to the physical I/O device 430 so that the domain 410 reaches a point at which the domain can pause I/O operations/transactions to the physical I/O device 430. The quiescing of outstanding requests to the physical I/O device 430 involves allowing any outstanding I/O operations/transactions that have progressed beyond the I/O queue point 420, i.e. any I/O operations/transactions that have been sent to the I/O controller but have not be acknowledged, are permitted to complete while all other I/O operations/transactions that are at the I/O queue point 420 are not permitted to progress to the I/O controller. The quiescing of outstanding requests is depicted in FIG. 4E as the elimination of the link between the I/O queue point 420 and the triangle 440 representing direct access to the physical I/O device 430.

Figure 4F:
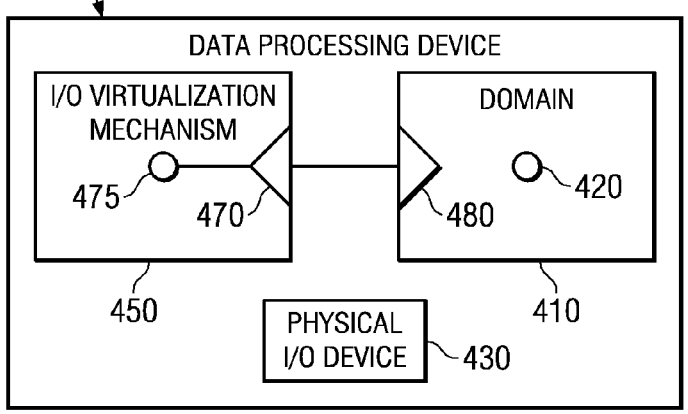

The domain 410 then releases, or hot-unplugs, the physical I/O device 430 from the domain 410, as shown in FIG. 4F by the elimination of the triangle 440 representing direct access to the physical I/O device 430. The hot-unplugging of a physical I/O device may involve different operating system specific operations depending upon the operating system utilized. As one example, the hot-unplugging of the physical I/O device 430 from the domain 410 may be performed in a similar manner as the hot-unplugging of USB devices that is generally known in the art. However, with the mechanisms of the illustrative embodiments, the hot-unplugging event is generated by the domain 410 as part of the virtualization operation for migration of the domain 410.

Figure 4G:
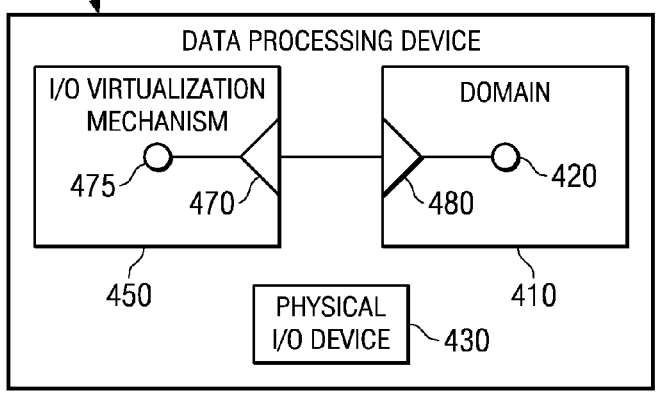

The domain 410 then inserts the new virtual device in the blocked I/O path from the I/O queue point 420. This is shown in FIG. 4G by the link between the I/O queue point 420 and the virtual I/O frontend device 480. I/O operations/transactions are allowed to continue again from the I/O queue point 420 to the virtual I/O frontend device 480.

As an example, when I/O operations are paused the I/O operations will begin to flow into the I/O queue point 420 where they will accumulate over time. While the I/O operations are accumulating, the virtual I/O frontend device 480 can be issued a remap command which will change the device (virtual or physical) underneath the virtual I/O frontend device 480. Once the remap operation is complete, I/O operations may be unpaused by resubmitting the operations to the virtual I/O frontend device 480.

Figure 4H:
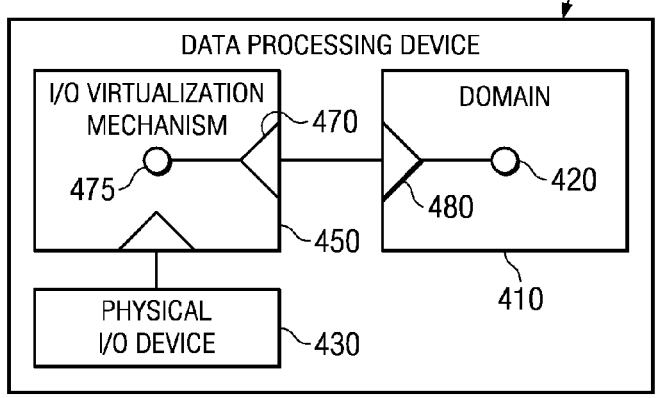

Once I/O operations begin to flow to the I/O virtualization mechanism 450 via the virtual I/O frontend device 480 and virtual I/O backend device 470, the I/O virtualization mechanism 450 claims the physical I/O device 430 and inserts the physical I/O device 430 underneath the created virtual I/O device that the I/O virtualization mechanism 450 is providing, as shown in FIG. 4H. In other words, the I/O virtualization mechanism 450 obtains direct access to the physical I/O device 430 and associates the physical I/O device 430 with the virtual device comprising the virtual I/O backend device 470 and the virtual I/O frontend device 480. This association is utilized by the I/O queue point 475 to dispatch I/O operations or transactions to the physical I/O device 430 via the direct access connection between the I/O virtualization mechanism 450.

Figure 4I:
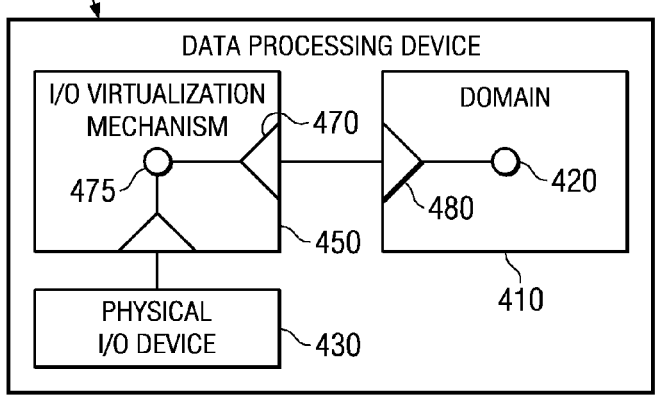

Thereafter, as shown in FIG. 4I, I/O operations or transactions are unblocked by the I/O virtualization mechanism 450 and I/O is allowed to flow into the physical I/O device 430 from the I/O queue point 475. It is at this point that the I/O between the domain 410 and the physical I/O device 430 is completely virtualized. As a result, the domain 410 may be migrated to another data processing device in a manner generally known in the art.

As an example, the migration process may be considered to be a transfer of necessary information from one running system to another. This information may be comprised of, for example, architected machine state information (register values in the processor) and the system state that is in memory. In most migration scenarios some sort of shared disk storage (such as a SAN or NFS) is used so that each machine has access to the shared disk storage. This is not a pure requirement, but without this requirement, a migration scenario would require transfer of this information as well, which may tend to be a very large amount of information.

Once the domain 410 is migrated to another data processing device, the domain 410 may direct I/O operations/transactions to a similar virtual device, i.e. virtual I/O frontend and backend devices, in the migrated domain 410 and an I/O virtualization mechanism in the new data processing device. Thus, the domain 410 may continue to operate using virtualized I/O. Alternatively, if the new data processing device has an appropriate physical I/O device similar to the physical I/O device 430 in the original data processing device 400, the virtual I/O may be converted back to direct access between the domain 410 and the physical I/O device of the new data processing device. Moreover, after completion of the event requiring migration, e.g., after completion of the scheduled maintenance of the original data processing device 400, the domain 410 may be migrated back to the original data processing device 400 and the virtualized I/O converted back to direct access between the domain 410 and the physical I/O device 430.

FIGS. 5A-5I are exemplary diagrams illustrating an operation for converting virtualized I/O to direct access I/O following migration of a domain in accordance with one illustrative embodiment. The operation shown in FIGS. 5A-5I may be performed, for example, after migration to the new data processing device or after migration back to the original data processing device following completion of the event causing the migration.

As shown in FIG. 5A, the I/O from the domain 510 is virtualized via the virtual I/O frontend device 580, virtual I/O backend device 570, and the I/O queue point 575 in the I/O virtualization mechanism 550. As shown in FIG. 5B, the I/O operations/transactions are blocked at the I/O queue point 575 and outstanding I/O operations/transactions are quiesced. The control of the I/O to the physical I/O device 530 is released by the I/O virtualization mechanism 550, as shown in FIG. 5C.

Figure 5D:
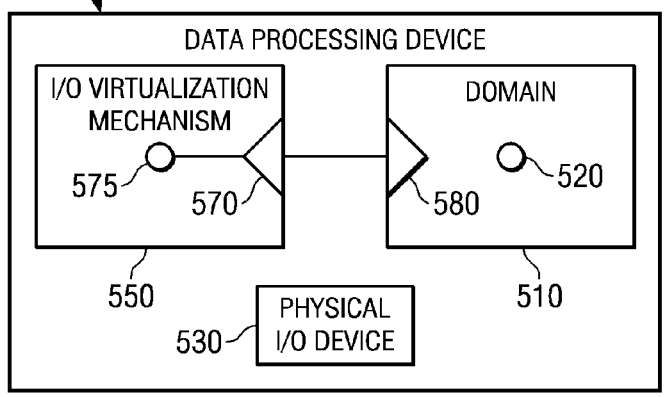
Figure 5E:
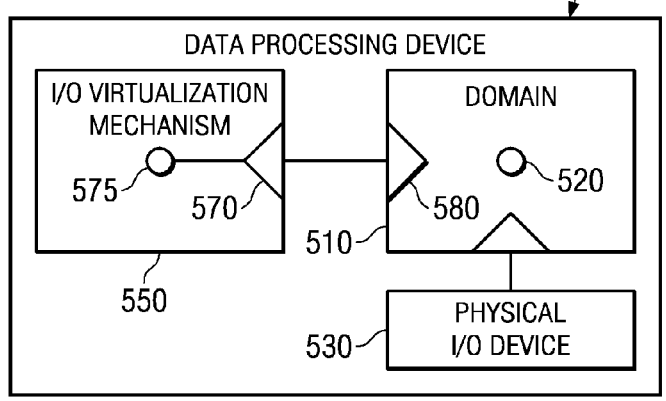
Figure 5F:
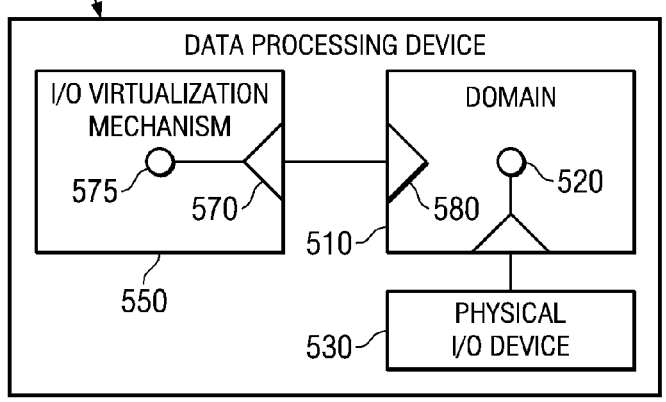

I/O operations from the I/O queue point 520 in domain 510 are then quiesced and blocked at the I/O queue point 520, as shown in FIG. 5D, and the domain 510 acquires ownership of the physical I/O device 530, as shown in FIG. 5E. Direct access I/O operations/transactions are then unblocked and allowed to flow from the I/O queue point 520 to the physical I/O device 530, as shown in FIG. 5F.

The virtual I/O frontend device 580 is hot-unplugged from the domain 510, as shown in FIG. 5G. The virtual I/O backend device 570 is then hot-unplugged from the I/O virtualization mechanism 550, as shown in FIG. 5H, and the domain 510 communicates I/O operations/transactions directly with the physical I/O device 530 via the I/O queue point 520, as shown in FIG. 5I.

FIGS. 6-7 are flowcharts outlining exemplary operations in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation for migrating a domain from one data processing system to another in accordance with one illustrative embodiment. The operation outlined in FIG. 6 may be performed, for example, in an I/O virtualization mechanism, such as a hypervisor, virtual I/O server, or the like. As shown in FIG. 6, the operation starts with the I/O virtualization mechanism receiving an event requiring migration of a domain (step 610). The I/O virtualization mechanism sends a request for physical I/O device information to the domain that is to be migrated (step 620). The physical I/O device information is received by the I/O virtualization mechanism (step 630) and used to generate a virtual I/O backend device and an associated I/O queue point in the I/O virtualization mechanism (step 640). The I/O virtualization mechanism then instructs the domain to hot-plug or insert a virtual I/O frontend device for the virtual device (step 650).

The domain, as a result, hot-plugs the virtual I/O frontend device (step 660) and quiesces and pauses I/O operations/transactions to the physical I/O device (step 662). The domain then hot-unplugs the physical I/O device (step 664) and inserts the virtual I/O frontend device into the I/O path from the I/O queue point of the domain (step 666). These operations are shown in dashed boxes to illustrate that they are performed by the domain and not the I/O virtualization mechanism itself.

The I/O virtualization mechanism then takes control of the I/O operations/transactions to the physical I/O device (step 670). I/O operations/transactions are then allowed to flow through the virtual I/O frontend device, virtual I/O backend device, and the I/O queue point in the I/O virtualization mechanism to the physical I/O device (step 680). At this point, the domain may be migrated to another data processing device (step 690). The operation then terminates.

FIG. 7 is a flowchart outlining an exemplary operation for converting virtualized I/O into direct access I/O following migration of a domain from one data processing system to another in accordance with one illustrative embodiment. Again, the operations outlined in FIG. 7 may be implemented, for example, by an I/O virtualization mechanism in response to determining that direct access between a domain and physical I/O devices is possible.

It should be noted that the determination as to when to convert virtualized I/O into direct access I/O following migration may be based on the type of action which initiates the migration in the first place. For example, for an administrator induced migration, it may be the responsibility of the administrator to make such a determination as to when to convert back to direct access I/O. For a automatically induced migration, the system may be required to keep track of the history of the domain to determine when the domain has returned to the domain's original location where the physical device is present. Other than returning to the original location, other automated mechanisms for determining if the new location is suitable for direct access I/O operations may be performed, such as by comparing device identifiers of the original data processing system with the current data processing system, or the like, to determine whether direct access I/O is possible.

With reference now to FIG. 7, the operation starts with the I/O virtualization mechanism blocking I/O operations/transactions at the I/O queue point (step 710). The I/O virtualization mechanism quiesces outstanding I/O operations/transactions (step 720). The control of the I/O to the physical I/O device is released by the I/O virtualization mechanism (step 730).

The domain quiesces I/O operations from the I/O queue point in the domain and blocks the I/O at the I/O queue point (step 740). The domain acquires ownership of the physical I/O device (step 742). The domain then unblocks direct access I/O operations/transactions are which are then allowed to flow from the I/O queue point of the domain to the physical I/O device (step 744). The domain then hot-unplugs the virtual I/O frontend device (step 746). As with FIG. 6 above, these steps are shown in dashed boxes to represent that they are not actually performed by the I/O virtualization mechanism but by the domain.

The I/O virtualization mechanism then hot-unplugs the virtual I/O backend device from the I/O virtualization mechanism (step 750). The operation then terminates. As a result, the domain thereafter communicates I/O operations/transactions directly with the physical I/O device via the domain's I/O queue point.

Thus, with the mechanisms of the illustrative embodiments, domains may maintain ownership of physical I/O devices during normal operation. When the domain needs to be migrated to another data processing device, the physical I/O device is virtualized so as to facilitate the migration. After migration, or after completion of the event requiring migration, the domain may be returned to direct access of physical I/O devices. In this way, the domain obtains the performance benefit of direct access to physical I/O devices while still being able to be migrated from one data processing device to another.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for migrating a domain from a first data processing device to a second data processing device, comprising:
    configuring the domain for direct access of a first physical input/output (I/O) device;
    reconfiguring the domain for virtualized access of the first physical I/O device via an I/O virtualization mechanism in response to an event requiring migration of the domain, wherein reconfiguring the domain for virtualized access of the first physical I/O device comprises:
        generating a virtual I/O backend device in the I/O virtualization mechanism that is logically the same as the first physical I/O device;
        generating a queue point in the I/O virtualization mechanism associated with the virtual I/O backend device that will block outstanding I/O requests once the outstanding I/O requests are redirected to the queue point in the I/O virtualization mechanism;
        injecting a virtual I/O frontend device into the domain, wherein, by injecting the virtual I/O frontend device into the domain, a connection is made from the virtual I/O frontend device to the virtual I/O backend device;
        quiescing the outstanding I/O requests to the first physical I/O device at a queue point in the domain thereby forming a blocked I/O path;
        releasing control of the first physical I/O device by the domain;
        inserting the virtual I/O frontend device into the blocked I/O path so that the quiesced outstanding I/O requests flow from the queue point in the domain to the queue point in the I/O virtualization mechanism;
        coupling the virtual I/O backend device to the first physical I/O device; and
        unblocking the outstanding I/O requests at the queue point in the I/O virtualization mechanism so that the outstanding I/O requests flow to the first physical I/O device: and
    migrating the domain from the first data processing device to the second data processing device following reconfiguration of the domain for virtualized access of the first physical I/O device.

2. The method of claim 1, wherein the event requiring migration of the domain is an automatically generated event.

3. The method of claim 2, wherein the automatically generated event is one of an event occurring automatically in accordance with a pre-established schedule or an event occurring automatically in response to a detected condition of the first data processing device or the data processing system.

4. The method of claim 1, further comprising:
    reconfiguring the domain for direct access of a second physical I/O device following migration of the domain from the first data processing device to the second data processing device.

5. The method of claim 1, further comprising:
    determining if the domain is migrated back to the first data processing device after having been migrated to the second data processing device; and
    reconfiguring the domain for direct access of the first physical I/O device following migration of the domain back to the first data processing device.

6. The method of claim 1, wherein the I/O virtualization mechanism is one of a virtual I/O server or a hypervisor.

7. A computer program product comprising a computer readable storage medium having a computer readable program recorded thereon, wherein the computer readable program, when executed in a data processing system, causes the data processing system to:
    configure a domain, in a first data processing device, for direct access of a first physical input/output (I/O) device;
    reconfigure the domain, in the first data processing device, for virtualized access of the first physical I/O device via an I/O virtualization mechanism in response to an event requiring migration of the domain, wherein the computer readable program causes the data processing system to reconfigure the domain for virtualized access of the first physical I/O device by:
        generating a virtual I/O backend device in the I/O virtualization mechanism that is logically the same as the first physical I/O device;
        generating a queue point in the I/O virtualization mechanism associated with the virtual I/O backend device that will block outstanding I/O requests once the outstanding I/O requests are redirected to the queue point in the I/O virtualization mechanism;
        injecting a virtual I/O frontend device into the domain, wherein, by injecting the virtual I/O frontend device into the domain, a connection is made from the virtual I/O frontend device to the virtual I/O backend device;
        quiescing the outstanding I/O requests to the first physical I/O device at a queue point in the domain thereby forming a blocked I/O path;
        releasing control of the first physical I/O device by the domain;
        inserting the virtual I/O frontend device into the blocked I/O path so that the quiesced outstanding I/O requests flow from the queue point in the domain to the queue point in the I/O virtualization mechanism;
        coupling the virtual I/O backend device to the first physical I/O device; and
        unblocking the outstanding I/O requests at the queue point in the I/O virtualization mechanism so that the outstanding I/O requests flow to the first physical I/O device; and
    migrate the domain from the first data processing device to a second data processing device following reconfiguration of the domain for virtualized access of the first physical I/O device.

8. The computer program product of claim 7, wherein the event requiring migration of the domain is an automatically generated event.

9. The computer program product of claim 8, wherein the automatically generated event is one of an event occurring automatically in accordance with a pre-established schedule or an event occurring automatically in response to a detected condition of the first data processing device or the data processing system.

10. The computer program product of claim 7, wherein the computer readable program further causes the data processing system to:
    reconfigure the domain for direct access of a second physical I/O device following migration of the domain from the first data processing device to the second data processing device.

11. The computer program product of claim 7, wherein the computer readable program further causes the data processing system to:

determine if the domain is migrated back to the first data processing device after having been migrated to the second data processing device; and reconfigure the domain for direct access of the first physical I/O device following migration of the domain back to the first data processing device.

12. The computer program product of claim 7, wherein the I/O virtualization mechanism is one of a virtual I/O server or a hypervisor.

13. A data processing system, comprising:

a first data processing device; and a second data processing device coupled to the first data processing device, wherein:

a domain, in the first data processing device, is configured for direct access of a first physical input/output (I/O) device;

the domain, in the first data processing device, is reconfigured for virtualized access of the first physical I/O device via an I/O virtualization mechanism, of the first data processing device, in response to an event requiring migration of the domain, wherein the domain is reconfigured for virtualized access of the first physical I/O device by:

generating a virtual I/O backend device in the I/O virtualization mechanism that is logically the same as the first physical I/O device;

generating a queue point in the I/O virtualization mechanism associated with the virtual I/O backend device that will block outstanding I/O requests once the outstanding I/O requests are redirected to the queue point in the I/O virtualization mechanism;

injecting a virtual I/O frontend device into the domain, wherein, by injecting the virtual I/O frontend device into the domain, a connection is made from the virtual I/O frontend device to the virtual I/O backend device;

quiescing the outstanding I/O requests to the first physical I/O device at a queue point in the domain thereby forming a blocked I/O path;

releasing control of the first physical I/O device by the domain;

inserting the virtual I/O frontend device into the blocked I/O path so that the quiesced outstanding I/O requests flow from the queue point in the domain to the queue point in the I/O virtualization mechanism;

coupling the virtual I/O backend device to the first physical I/O device; and unblocking the outstanding I/O requests at the queue point in the I/O virtualization mechanism so that the outstanding I/O requests flow to the first physical I/O device; and the domain is migrated from the first data processing device to the second data processing device following reconfiguration of the domain for virtualized access of the first physical I/O device.

14. The system of claim 13, wherein the event requiring migration of the domain is an automatically generated event.

15. The system of claim 14, wherein the automatically generated event is one of an event occurring automatically in accordance with a pre-established schedule or an event occurring automatically in response to a detected condition of the first data processing device or the data processing system.

16. The system of claim 13, wherein the domain is reconfigured for direct access of a second physical I/O device following migration of the domain from the first data processing device to the second data processing device.

17. The system of claim 13, wherein if the domain is migrated back to the first data processing device after having been migrated to the second data processing device, the domain is reconfigured for direct access of the first physical I/O device following migration of the domain back to the first data processing device.

18. The system of claim 13, wherein the I/O virtualization mechanism is one of a virtual I/O server or a hypervisor.

19. The method of claim 1, wherein the event requiring migration of the domain is a human operator generated event.

20. The computer program product of claim 7, wherein the event requiring migration of the domain is a human operator generated event.

21. The system of claim 13, wherein the event requiring migration of the domain is a human operator generated event.

* * * * *